United States Patent [19]
Goss et al.

[11] Patent Number: 4,523,810
[45] Date of Patent: Jun. 18, 1985

[54] OPTICAL FIBER COUPLING METHOD AND APPARATUS

[75] Inventors: Willis C. Goss, Altadena; Mark D. Nelson, Montrose; John M. McLauchlan, Pasadena, all of Calif.

[73] Assignee: The United States of America as represented by the Administrator of the National Aeronautics and Space Administration, Washington, D.C.

[21] Appl. No.: 342,828

[22] Filed: Jan. 26, 1982

[51] Int. Cl.³ .............................................. G02B 5/14
[52] U.S. Cl. .................................... 350/320; 156/166; 350/96.15
[58] Field of Search ................... 350/96.15, 96.16, 320; 156/625, 626, 629, 630, 637, 166

[56] References Cited

U.S. PATENT DOCUMENTS

| | | | |
|---|---|---|---|
| 4,054,366 | 10/1977 | Barnoski et al. | 350/96.15 |
| 4,264,126 | 4/1981 | Sheem | 350/96.15 |
| 4,315,666 | 2/1982 | Hicks, Jr. | 350/96.15 |
| 4,355,863 | 10/1982 | Aulich et al. | 350/96.15 |
| 4,360,247 | 11/1982 | Beasley | 350/96.15 |
| 4,392,712 | 7/1983 | Ozeki | 350/96.16 |
| 4,410,236 | 10/1983 | Schiffner | 350/96.15 X |

FOREIGN PATENT DOCUMENTS

| | | | |
|---|---|---|---|
| 3038048 | 10/1981 | Fed. Rep. of Germany | 350/96.15 |
| 52-14430 | 2/1977 | Japan | 350/96.15 |
| 53-91752 | 8/1978 | Japan | 350/96.15 |

OTHER PUBLICATIONS

Bergh et al., "Single-Mode Fibre Optic Directional Coupler", *Electron. Lett.*, vol. 16, No. 7, Mar. 1980, pp. 260-261.

Sheem et al., "Single-Mode Fiber-Optical Power Divider: . . . ", *Optics Lett.*, vol. 4, No. 1, Jan. 1979, pp. 29-31.

Liao et al., "Single-Mode Fiber Coupler", *Appl. Optics*, vol. 20, No. 15, Aug. 1981, pp. 2731-2734.

*Primary Examiner*—John Lee
*Attorney, Agent, or Firm*—Paul F. McCaul; John R. Manning; Thomas H. Jones

[57] ABSTRACT

Systems are described for coupling a pair of optical fibers to pass light between them, which enables a coupler to be easily made, and with simple equipment, while closely controlling the characteristics of the coupler. One method includes mounting a pair of optical fibers (12A, 14A) on a block (26) having a large hole (28) therein, so the fibers extend across the hole while lying adjacent and parallel to one another. The fibers are immersed in an etchant (40) to reduce the thickness of cladding (20) around the fiber core (18). The fibers are joined together by applying a liquid polymer (16, FIG. 6) so the polymer-air interface moves along the length of the fibers to bring the fibers together in a zipper-like manner, and to progressively lay a thin coating of the polymer on the fibers.

6 Claims, 10 Drawing Figures

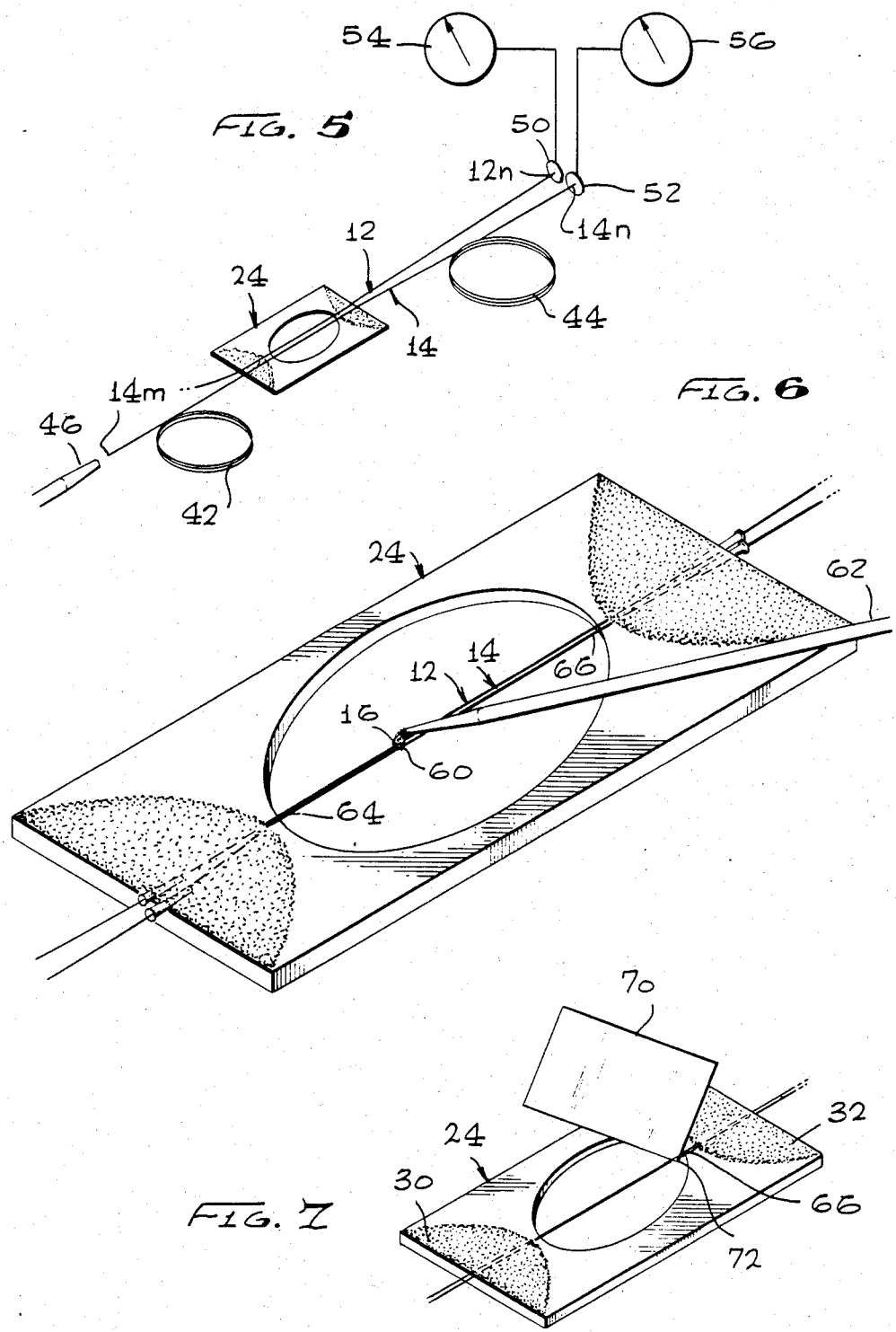

4,523,810

OPTICAL FIBER COUPLING METHOD AND APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Fiber optic couplers are useful in a variety of applications to transfer light from one optic fiber to another, especially in place of a beamsplitter in interferometrics where coherent separation or combination of light is required. In one example described in U.S. Pat. No. 4,280,760, such a coupler is used in an optical gyroscope to split a coherent lightbeam into two equal portions that travel in opposite directions about a loop and are then recombined to detect their phase difference; the interferometric pattern representing phase difference, is proportional to the rotation rate of the loop. Substantial practical difficulties have been involved in fabricating single mode fiber optic waveguide couplers. One approach has been to embed a pair of fiber optic waveguides, or optical fibers, into blocks, to lap away controlled amounts of the optical fiber claddings, and to then place the lapped cladding surfaces into contact with each other. Since a typical optical fiber is of very small size, very small tolerances must be maintained, which makes this coupling technique a difficult and costly one. In another technique, the claddings of two optic fibers are largely removed by etching, and the fibers are then twisted about one another to provide a coupling contact length which is variable with the number of twists. This approach results in a fragile device, and does not preserve the polarization state of the light transmitted between the optic fibers. A technique for coupling a pair of optical fibers in a manner that avoided critically precise fabrication operations, which enabled close control of the amount of coupling, which preserved the polarization state of the coupled light, and which resulted in a reliable device, would be of considerable value.

SUMMARY OF THE INVENTION

In accordance with one embodiment of the present invention, a method and apparatus are provided for fiber optic waveguide couplers, which provide easily constructed and reliable couplers. The fibers can be handled by mounting them above the surface of a block, by mounting the fibers so they extend parallel and adjacent to one another across the block. The fibers can be etched by dipping the block into an etchant. The degree of coupling between fibers can be measured by withdrawing the block from a liquid bath so adjacent portions of the fibers lie at the liquid-air interface, to zip the fibers together for testing of degree of coupling. The fibers then can be joined together.

In one joining technique, the fibers are joined by applying a liquid bonding material to both fibers and moving the interface, between liquid and air, along the length direction of the fibers. The surface tension of the bonding material holds the fibers in direct contact with one another, and they remain thereat when the bonding material hardens. In another method, one etched fiber is deflected intimately against the other, and the claddings of the fibers are then fused together.

The novel features of the invention are set forth with particularity in the appended claims. The invention will be best understood from the following description when read in conjunction with the accompanying drawings.

BRIEF DESCRIPTION OF THE DRAWINGS

FIG. 5 is a perspective view showing the fibers of FIG. 1 during a testing process.

FIG. 6 is a perspective view of the block and fibers of FIG. 1, shown during a further step in the process of the invention.

FIG. 7 is a perspective view of the apparatus of FIG. 5, shown during a further step of the invention.

DESCRIPTION OF THE PREFERRED EMBODIMENTS

Figure 2:
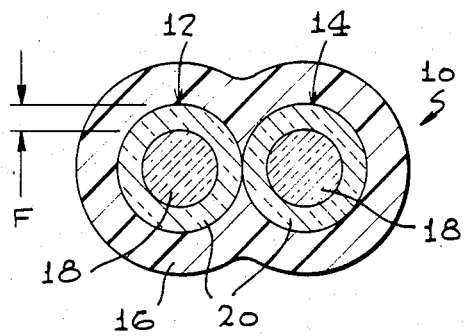
FIG. 2 is a sectional view of the fibers of FIG. 1, after they have been completely formed into a coupler.

FIG. 2 illustrates a completed coupler 10 consisting of two optical fibers 12, 14 in accordance with one embodiment of the invention, wherein the fibers are held in intimate contact by a layer 16 of light-transmitting bonding material. Each of the fibers such as 12, includes a core 18 of light-transmitting material, and a thin cladding 20 of material having a slightly lower index of refraction. The cladding layers 20 of the two fibers are held in intimate contact along an appreciable length such as one centimeter, to enable the passage of light from one fiber to the other. It can be seen that the claddings 20 have a substantially circular periphery and make substantially point contact as seen in the sectional view of FIG. 2. Each of the fibers such as 12, which is of reduced diameter following the fabrication process of the invention, may have a diameter of less than 1/1000th inch, so that the handling and precise positioning of the fibers can be difficult.

Figure 1:
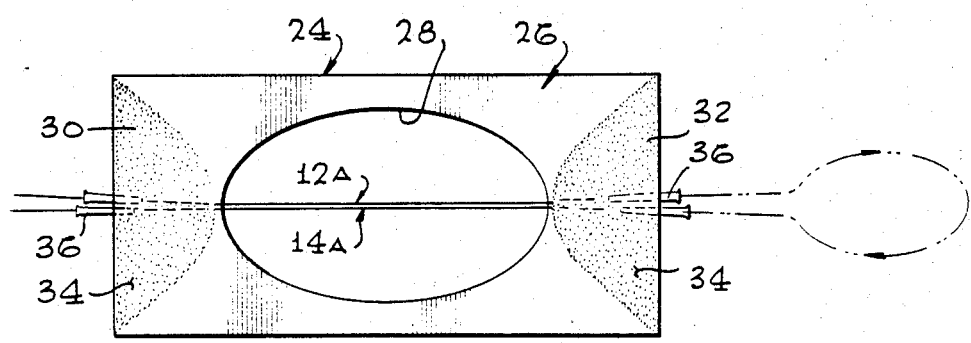
FIG. 1 is a plan view of a pair of fibers on a mounting block, in one step of a method of the invention.

FIG. 1 illustrates a mounting arrangement 24 utilized to hold a pair of optic fibers 12A, 14A during the fabrication process of the invention. The two fibers 12A, 14A are mounted on a mounting block 26 which has a through opening 28 (of course, the block could extend along only three sides of the opening 28, instead of all four sides). The fibers are mounted on mount surfaces 30, 32 at opposite ends of the opening, with the fibers extending parallel and adjacent to one another across the opening 28. Each fiber is held to a mount surface by a quantity 34 of acid-resistant mounting material such as wax that adheres to the fibers and the mounting block. Each fiber is normally supplied with a protective jacket, but the jacket is removed along the fiber portions that extend across the mounting block opening 28. It may be noted that the fibers extend through ferrules 36 on the block to prevent sharp bending of the fibers and consequent damage thereto during the fabrication process.

Figure 3:
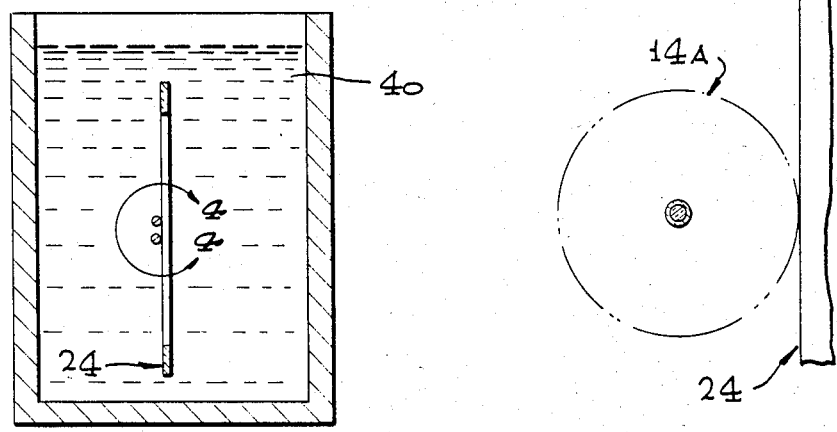
FIG. 3 is a sectional view of the block and fibers of FIG. 1, shown during an etching step of the invention.

In a first fabrication step, the claddings of the fibers are etched to reduce their thicknesses. This is accomplished, as shown in FIG. 3, by immersing the mount assembly 24 in a bath 40 of etchant solution. The thicknesses of the fibers can be monitored by various techniques. One method is to observe the diffraction pattern on a screen behind the fibers when a laser beam is directed at them. However, it is found that the diameters can be determined by the etching time. After etching in a concentrated etchant, the assembly 24 is removed and washed in distilled water, and, if necessary, the diameters of the fibers determined by examination with a microscope. When the diameter approaches the required final diameter, the assembly 24 is repeatedly dipped into a weaker etchant, rinsed, and the degree of optical coupling between the fibers measured.

FIG. 5 shows a technique for measuring the degree of optical coupling between the fibers 12, 14. One of the fibers 14 is shown as including considerable lengths held as coils 42, 44. A light source 46 directs a light beam into an end 14m of one of the fibers 14. The other ends 12n, 14n of the fibers are then positioned so light from their tips shines on photodetectors 50, 52. The electrical outputs from the photodetectors are measured by meters 54, 56. Photo-voltaic detectors can be used as current sources and with the current measured by meters, all as well known in the art. When the desired coupling ratio has been achieved, etching of the fibers can be stopped. In many applications, 50% coupling of light is desired. During testing, the fibers 12, 14 must be held in intimate contact. This is accomplished by withdrawing the block from a bath of rinsing water in the manner illustrated in FIG. 8, which allows surface tension of a thin water coating on the fibers, to bring the fibers together in a zipper-like manner, as described below.

Figure 4:
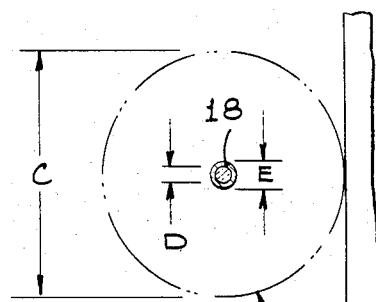
FIG. 4 is a view of the area 4—4 of FIG. 3.

FIG. 4 shows how etching progresses for the fibers 12A, 14A. In one example of typical fibers, the initial outside diameter C of the cladding of each fiber is 80 micrometers, while the core 18 has a diameter D of 4.5 micrometers. In order to obtain 50% coupling, the outside diameter of the individual fibers is reduced to a diameter E of about 7.5 micrometers, so the cladding thickness F (FIG. 2) is about two micrometers, and the two fibers are held in intimate contact along a length of about 15 millimeters. Each fiber extends along a straight line along the coupling length, rather than one being twisted about the other, to preserve the polarization of the coupled light.

FIG. 6 shows one method in which the two etched fibers 12, 14 can be held together with their claddings in intimate contact. A drop 60 of a light-transmitting bonding material of lower index of refraction than the optic fiber claddings, and which is initially liquid but which can be hardened, is held on an applicator 62. The liquid bonding material is hydrophillic to the fibers (adheres to their claddings). The drop is initially applied to one end 64 of the etched portions of the fibers, and moved along the length of the fibers towards the opposite end 66 of the etched portions. A thin layer of the bonding material 16 of the drop is progressively layed on the fibers. The surface tension of the liquid bonding material on the fibers, draws the fibers together until their claddings are in intimate contact as shown in FIG. 2. Thus, the surface tension of the liquid applied to the fibers serves to hold them in intimate contact to optically couple them. Fibers have been bonded by the use of Sylgard 184 silastic which is sold by Dow Chemical Company.

The length of the coupled fiber portions is made to be somewhat greater than required for the desired degree of coupling of the fibers. After the liquid bonding material has been applied, but is still liquid, the percent coupling is tested as by the use of the setup shown in FIG. 5. The degree of fiber coupling is then reduced by separating a small length of the fibers, as by the technique illustrated in FIG. 7. A thin blade 70 is mounted on a precision manipulator to accurately move it, and the blade is then moved so a portion 72 thereof is inserted between the fibers at one end 66 of the coupled fiber length. The blade 70 is then slowly moved along the length of the fibers while the coupling percentage is monitored, until the coupling ratio is correct. The bonding material is then cured (which occurs naturally for the Sylgard 184 silastic, but which can be speeded up by heating). The blade then can be removed from the bonding material and the fibers totally encapsulated to stabilize against vibration.

Figure 8:
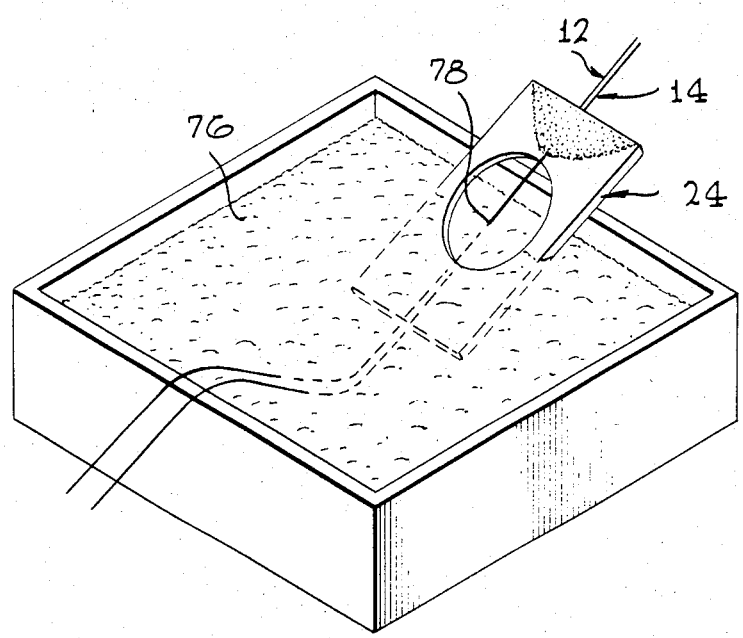
FIG. 8 is a perspective view of a fiber and mount block assembly, shown during a method of another embodiment of the invention.

FIG. 8 illustrates another method for utilizing surface tension of liquid to hold the pair of fibers 12, 14 in intimate contact. The block and fiber arrangement 24 is initially dipped into a bath 76 of bonding material such as the above-described sylastic, so that the block is substantially completely immersed. The block-fiber arrangement 24 is then removed from the bath with the orientation of the fibers closely controlled during the removal process, so that both fibers are in contact with the surface film of the bath simultaneously at adjacent locations on the fibers, which lie at the point 78 in the figure. Surface tension forces then bring the two fibers together with a zipper-like action, as the surface film-to-fiber interface line moves down along the fibers. With the two fibers zipped together, the same technique utilized in FIG. 7 to separate a portion of the fibers to obtain the desired degree of coupling, can be performed prior to hardening of the bonding material.

While the technique indicated in FIG. 8 to hold a pair of fibers together can be used to coat the fibers with hardenable bonding material, a smaller amount of bonding material can be utilized by employing the technique of FIG. 6 wherein only a drop is run along the fibers. However, the technique of FIG. 8 is useful in temporarily holding the fibers together after they are etched for a while, and then dipped in rinse water, to test them with the apparatus of FIG. 5 to determine the degree of coupling, particularly as the fiber diameter decreases to an amount close to its final diameter. In that case, the liquid bath is of water, but the same zipping together of fibers occurs.

Figure 9:
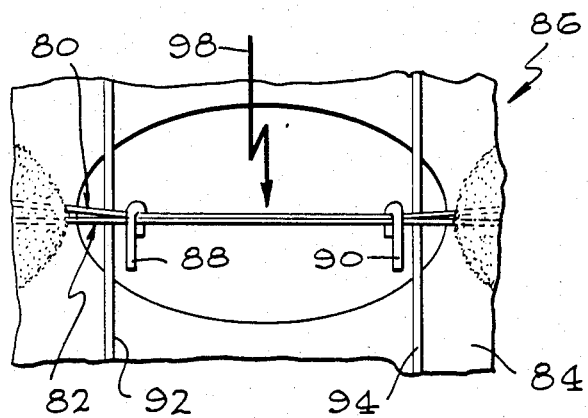
FIG. 9 is a partial plan view of a fiber and mounting block assembly shown during a process of still another embodiment of the invention.
Figure 10:
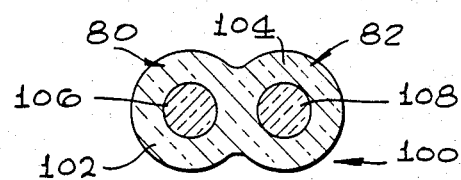
FIG. 10 is a sectional view of the fibers of FIG. 9, but shown after the completion of the fabricating process therefor.

While the use of bonding material to hold a pair of fibers together has been found to provide reproduceable closely controlled couplers, another coupling technique also has been devised. This other coupling technique, shown in FIG. 9, involves the mounting of a pair of fibers 80, 82 on a block 84 to provide an arrangement 86 similar to that of FIG. 1. The arrangement of fibers on the block is dipped into an etchant to etch away the claddings of the fibers until the fibers are of a reduced diameter. The two fibers are then joined by fusing them together, as by arc welding. One problem encountered in such fusion, is to hold the two fibers together in intimate contact. One way this may be accomplished is by hanging a pair of weights 88, 90 on one of the fibers 80 near opposite ends of the etched region, to deflect that fiber 80 against the other one 82. A pair of wires 92, 94 are positioned between the fibers and the mounting block 84 to slightly stretch the fibers. After the weights have been applied to deflect the fibers against each other, an arc welding discharge 98 is applied and moved along the fibers to weld them together, beginning near one end of the etched region and continuing until the desired degree of coupling is observed to occur. The final arrangement is of the type shown in FIG. 10 at 100, which shows the fibers 80, 82 with unaffected cores 106, 108, wherein the claddings 102, 104 of the two fibers have been welded together.

Thus, the invention provides optical fiber waveguide couplings and techniques for forming them, which enables their formation in a relatively simple manner with relatively inexpensive equipment, all while achieving couplings of closely controllable characteristics. A pair of optical fibers can be etched and otherwise processed by first mounting them on a block with a through hole and with the fibers extending from one block surface to the other across the hole. Such a block can be dipped into etchants and rinsing solutions, with long sections of the fiber being free of one another and of any support to enable effective uniform etching of their claddings, and yet to enable the fibers to be later easily brought together in intimate contact along a considerable length. The fibers can be brought together in intimate contact over a considerable length, for testing of the coupling or later bonding of the fibers together, by moving a liquid-air (or other gas) interface along the length direction of the fibers, and with the interface lying at fiber locations that are adjacent to one another. This allows surface tension of the thin layer of liquid remaining on the fibers to tightly hold the fibers together. In another technique, small weights are applied to one of the fibers to deflect it against the other, prior to permanent connection of the fibers to each other.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for coupling a pair of optical fibers, comprising:
    holding said fibers parallel and adjacent to one another; and
    applying a liquid to said fibers which is hydrophillic to said fibers, by moving a liquid-gas interface along the length direction of the fibers to zip them together.

2. The method described in claim 1 wherein:
    said step of applying includes moving a drop of liquid along the length direction of said fibers while the liquid coats the fibers.

3. The method described in claim 1 wherein:
    said step of applying includes immersing the fibers in a liquid bath and drawing the fibers out of the bath so an imaginary line joining the fibers and extending perpendicular to them also lies primarily in the horizontal plane of the liquid surface.

4. The method described in claim 1 including:
    initially bringing the fibers together along a length greater than required for a predetermined degree of optical coupling;
    testing the degree of optic fiber coupling; and
    applying a thin element progressively between said fibers to wedge them apart to decrease the degree of optical coupling between them.

5. The method described in claim 1 wherein:
    each fiber has a core and a cladding surrounding the core; and
    said liquid which zips said fibers together comprises a polymer of lower index of refraction than the fiber claddings, and including the step of hardening said liquid to permanently hold the fibers together.

6. A method for coupling a pair of optic fibers, which each have a core and a cladding surrounding the core, comprising:
    mounting said fibers on a mounting block having a pair of opposite mount surfaces and a through opening between said mount surfaces, with each fiber mounted on both mount surfaces and extending parallel and adjacent to the other fiber, across said opening;
    dipping said mounting block in an etchant bath to reduce the cladding thickness; and
    joining said fibers together, while they are mounted on said block, along portions of the fiber lengths which extend across said opening;
    said step of joining including hanging a weight on one of said fibers at a pair of locations spaced along said through opening to lie near opposite ends thereof, whereby to deflect the fibers against one another.

* * * * *